(12) United States Patent
Tsukashima et al.

(10) Patent No.: US 12,521,171 B2
(45) Date of Patent: Jan. 13, 2026

(54) MACERATOR FOR INTRACRANIAL SURGERY

(71) Applicant: Rebound Therapeutics Corporation, Irvine, CA (US)

(72) Inventors: Ross Tsukashima, Irvine, CA (US); Peter G. Davis, Irvine, CA (US); Matthew Scott Lake, Irvine, CA (US)

(73) Assignee: Rebound Therapeutics Corporation, Irvine, CA (US)

( * ) Notice: Subject to any disclaimer, the term of this patent is extended or adjusted under 35 U.S.C. 154(b) by 753 days.

(21) Appl. No.: 16/550,160

(22) Filed: Aug. 23, 2019

(65) Prior Publication Data

US 2020/0113619 A1 Apr. 16, 2020

Related U.S. Application Data

(60) Provisional application No. 62/744,445, filed on Oct. 11, 2018.

(51) Int. Cl.
*A61B 18/14* (2006.01)
*A61B 17/32* (2006.01)
(Continued)

(52) U.S. Cl.
CPC ................ *A61B 18/148* (2013.01); *A61B 2017/320024* (2013.01); *A61B 2017/320032* (2013.01); *A61B 2017/32007* (2017.08); *A61B 2017/320084* (2013.01); *A61B 2017/320716* (2013.01); *A61B 17/320758* (2013.01); *A61B 2017/320775* (2013.01); *A61B 17/320783* (2013.01); *A61B 2018/00446* (2013.01);
(Continued)

(58) Field of Classification Search
CPC .... A61B 17/320758; A61B 17/320783; A61B 2017/320024; A61B 2017/320032; A61B 2017/320775; A61B 17/32002
USPC .............................. 604/22; 600/105; 606/45
See application file for complete search history.

(56) References Cited

U.S. PATENT DOCUMENTS 4,522,505 A * 6/1985 Medd .................... B01F 27/05
366/279
5,226,909 A * 7/1993 Evans ............ A61B 17/320758
606/159
(Continued)

FOREIGN PATENT DOCUMENTS

CN 106470618 3/2017
EP 0403402 A1 * 12/1990 .............. B01F 27/88
(Continued)

OTHER PUBLICATIONS

International Search Report from International Application No. PCT/US2019/054804 dated Jan. 23, 2020.
(Continued)

*Primary Examiner* — Darwin P Erezo
*Assistant Examiner* — Mitchell Brian Hoag
(74) *Attorney, Agent, or Firm* — Crockett & Crockett, PC; K. David Crockett, Esq.

(57) ABSTRACT

A tool for treating hematoma in the brain, and other tissue in the body, especially suited for use through a cannula. The tool may include a cautery probe for sealing blood vessels in the brain, and a macerating structure for disrupting a hematoma, and aspiration features for removing macerated hematoma debris from the body.

12 Claims, 5 Drawing Sheets

(51) Int. Cl.
    *A61B 17/3207* (2006.01)
    *A61B 18/00* (2006.01)
    *A61B 90/00* (2016.01)
(52) U.S. Cl.
    CPC ........... *A61B 2018/00595* (2013.01); *A61B 2018/00642* (2013.01); *A61B 2018/00672* (2013.01); *A61B 2018/00875* (2013.01); *A61B 2090/065* (2016.02); *A61B 2217/005* (2013.01); *A61B 2218/007* (2013.01)

(56) References Cited

U.S. PATENT DOCUMENTS

| | | | | |
|---|---|---|---|---|
| 5,242,460 | A * | 9/1993 | Klein | A61B 17/320783 606/159 |
| 5,487,747 | A * | 1/1996 | Stagmann | A61F 9/00763 606/166 |
| 5,529,580 | A * | 6/1996 | Kusunoki | A61B 17/32002 606/180 |
| 5,569,178 | A * | 10/1996 | Henley | A61B 17/32002 604/22 |
| 5,569,284 | A * | 10/1996 | Young | A61B 17/32002 606/180 |
| 5,823,990 | A * | 10/1998 | Henley | A61B 17/32002 606/167 |
| 5,857,995 | A * | 1/1999 | Thomas | A61B 17/32002 606/166 |
| 5,871,454 | A * | 2/1999 | Majlessi | A61B 10/0266 600/564 |
| 5,896,971 | A * | 4/1999 | Hein | F16C 37/007 411/24 |
| 6,113,593 | A | 9/2000 | Tu et al. | |
| 6,152,919 | A * | 11/2000 | Hakky | A61B 17/32002 606/14 |
| 10,945,758 | B1 * | 3/2021 | Davis | A61B 17/320758 |
| 2003/0045870 | A1 | 3/2003 | Madsen | |
| 2007/0010823 | A1 * | 1/2007 | Kucklick | A61M 1/772 606/80 |
| 2008/0004647 | A1 * | 1/2008 | To | A61B 17/320758 606/159 |
| 2008/0021447 | A1 | 1/2008 | Davison et al. | |
| 2008/0172052 | A1 | 7/2008 | Eder et al. | |
| 2008/0177199 | A1 | 7/2008 | Podhajsky | |
| 2010/0030212 | A1 | 2/2010 | Aramayo | |
| 2010/0036312 | A1 * | 2/2010 | Krolik | A61M 25/0068 606/159 |
| 2010/0100098 | A1 * | 4/2010 | Norton | A61B 17/32002 606/86 R |
| 2010/0228240 | A1 | 9/2010 | Henriksson et al. | |
| 2011/0218526 | A1 | 9/2011 | Mathur | |
| 2014/0031844 | A1 * | 1/2014 | Kusleika | A61B 17/320783 606/159 |
| 2014/0066929 | A1 | 3/2014 | Mark et al. | |
| 2014/0148830 | A1 * | 5/2014 | Bowman | A61B 17/320758 606/159 |
| 2014/0277039 | A1 * | 9/2014 | Liberatore | A61B 17/32053 606/167 |
| 2014/0330286 | A1 * | 11/2014 | Wallace | A61M 3/0283 606/127 |
| 2014/0371735 | A1 | 12/2014 | Long | |
| 2015/0088120 | A1 | 3/2015 | Garcia et al. | |
| 2015/0305765 | A1 | 10/2015 | Fojtik et al. | |
| 2015/0351836 | A1 | 12/2015 | Prutchi | |
| 2018/0353199 | A1 * | 12/2018 | Tada | A61B 17/32002 |
| 2019/0125391 | A1 * | 5/2019 | Palushi | A61B 17/1688 |
| 2019/0142452 | A1 * | 5/2019 | Trosper | A61B 17/320758 606/159 |
| 2019/0262031 | A1 * | 8/2019 | Efremkin | A61B 17/3207 |
| 2019/0357936 | A1 * | 11/2019 | To | A61P 35/00 |
| 2022/0000507 | A1 * | 1/2022 | Hauser | A61B 17/320758 |

FOREIGN PATENT DOCUMENTS

| | | |
|---|---|---|
| JP | 2010525867 | 7/2010 |
| JP | 2011045756 | 3/2011 |
| JP | 2011131061 | 7/2011 |
| JP | 2013519438 | 5/2013 |
| JP | 2015119895 | 7/2015 |
| JP | 2015532604 | 11/2015 |
| JP | 2016147018 | 8/2016 |
| WO | WO0007507 | 2/2000 |
| WO | WO2007028151 | 3/2007 |
| WO | WO2017201203 | 11/2017 |
| WO | WO2018035366 | 2/2018 |

OTHER PUBLICATIONS

Partial Supplementary European Search Report dated Jun. 15, 2022 from European Patent Application No. 19870985.9.
Notification of Reasons for Refusal dated Jun. 20, 2023 from corresponding JP Application 2021-520189.
Notification of Reasons for Refusal dated Feb. 6, 2024 from Japanese Patent Application No. 2021-520189.
Office Action dated Nov. 22, 2023 from Chinese Application No. 201980074205.5.
Office Action dated Apr. 11, 2025 from European Patent Application No. 19870985.9.
McCann, et al., Variation in reported Human Head Tissue Electrical Conductivity Values, Brain Topography, Human Sciences Press, vol. 32, May 3, 2019.
Examination Report No. 2 dated Aug. 5, 2024 from Australian Patent Application No. 2019357958.
Office Action dated Jul. 1, 2024 from Chinese Patent Application No. 201980074205.5.
Office Action dated Jul. 24, 2024 from Korean Patent Application No. 10-2021-7014131.
Notification of Reasons for Refusal dated Nov. 12, 2024 from Japanese Patent Application No. 2023-183133.
Examination Report No. 1 dated May 28, 2024 from Australian Patent Application 2019357958.
Notice of Allowance dated Feb. 27, 2025 from Korean Patent Application No. 1020217014131.

* cited by examiner

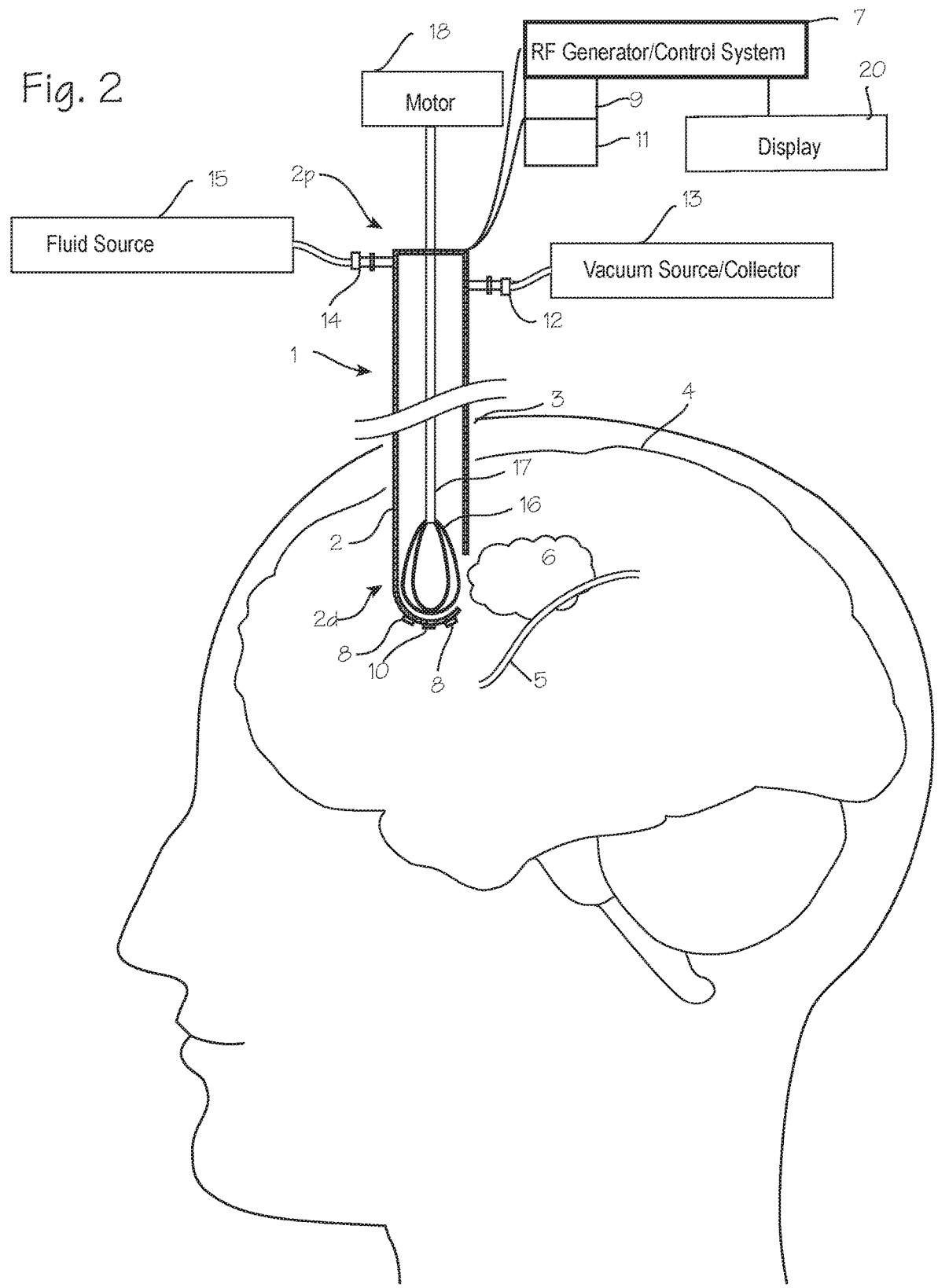

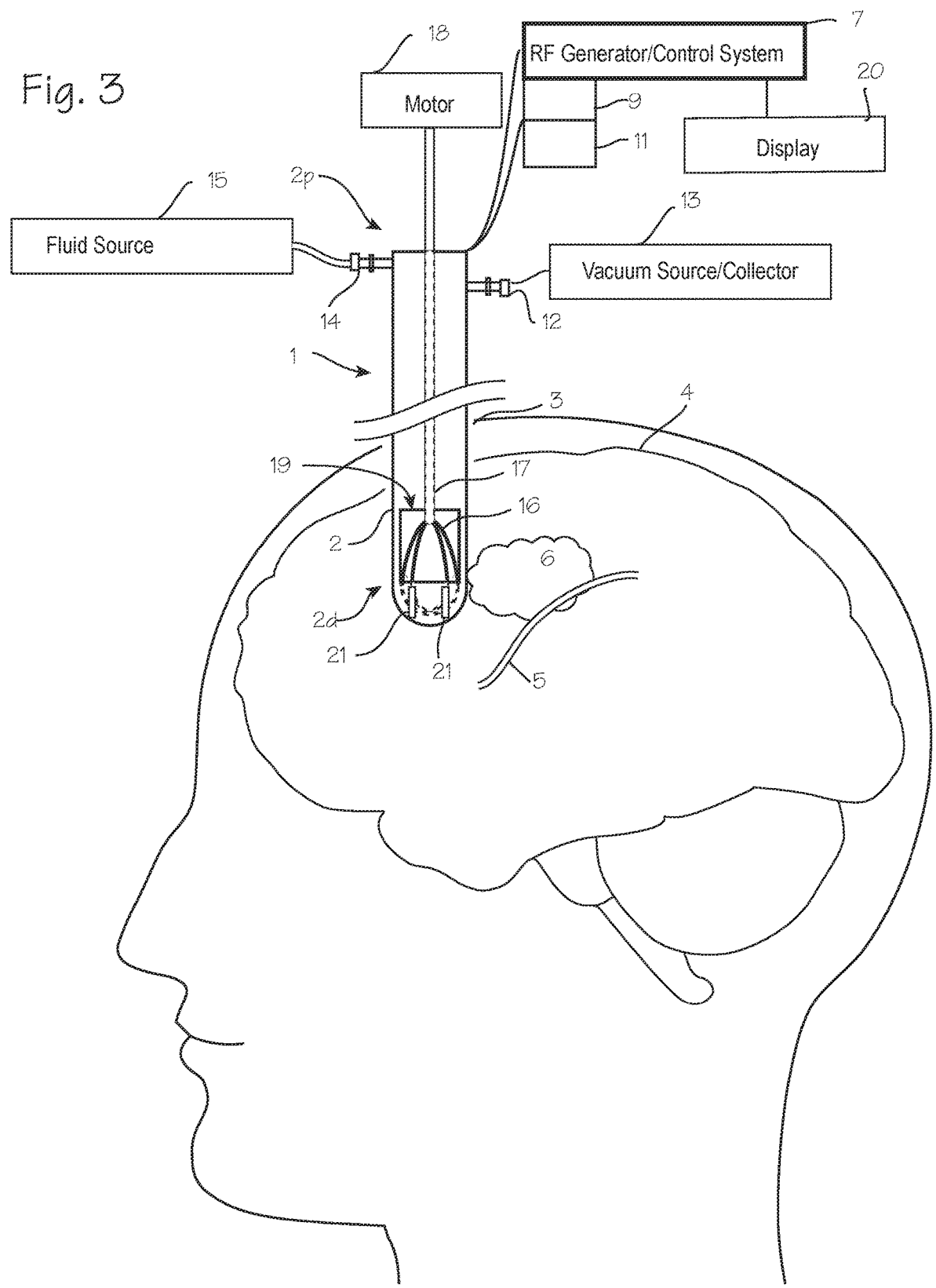

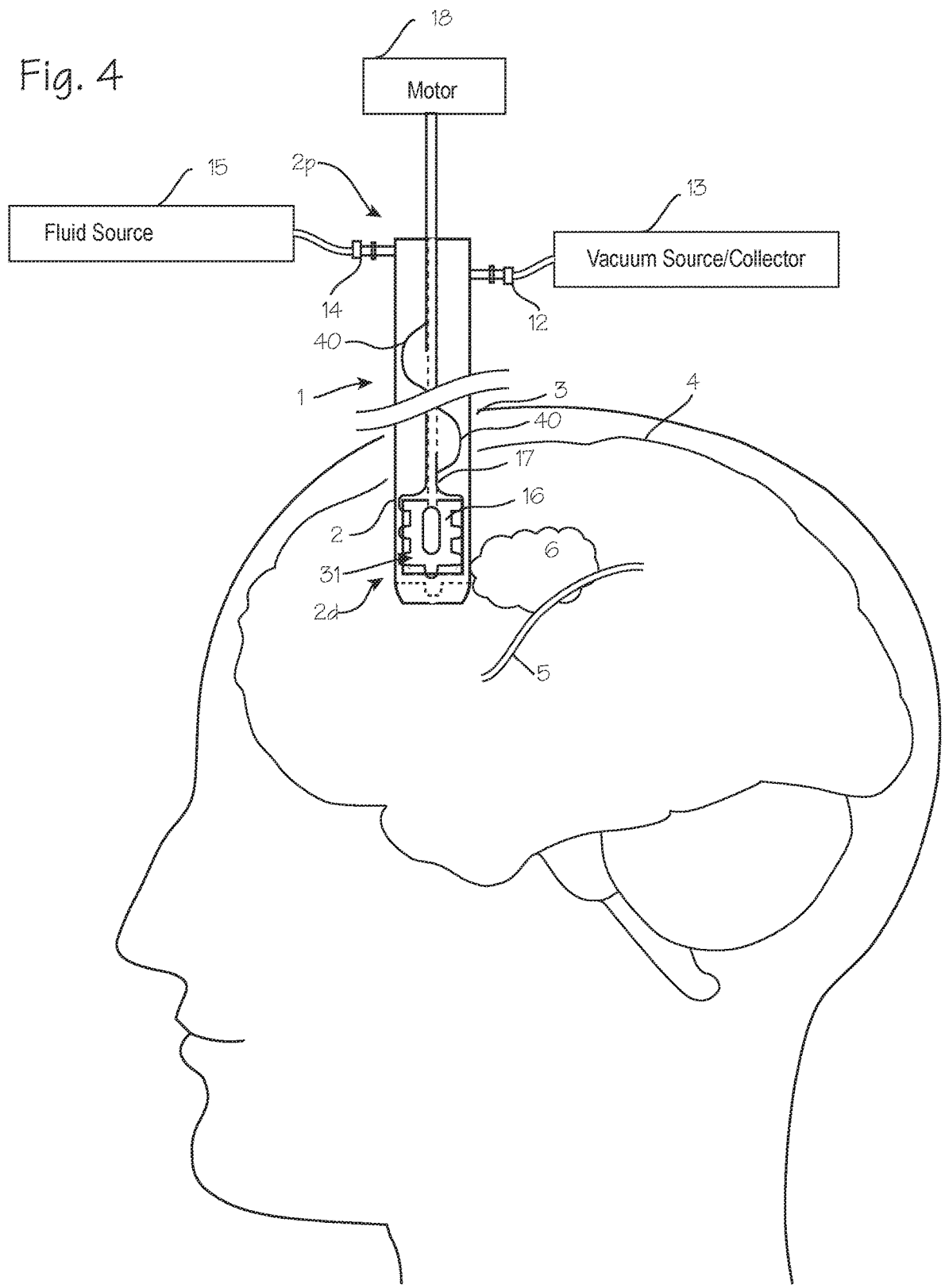

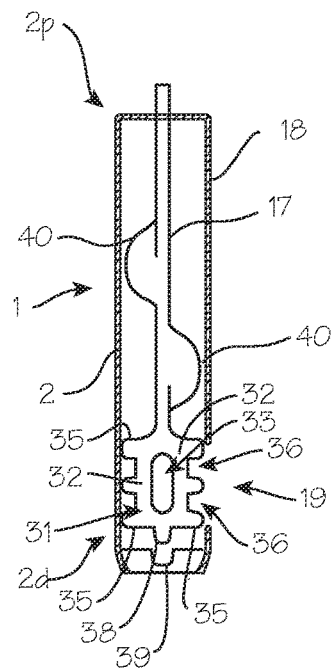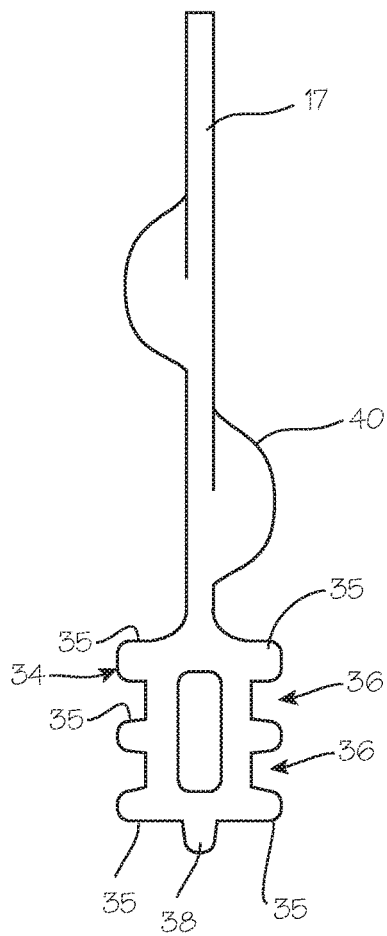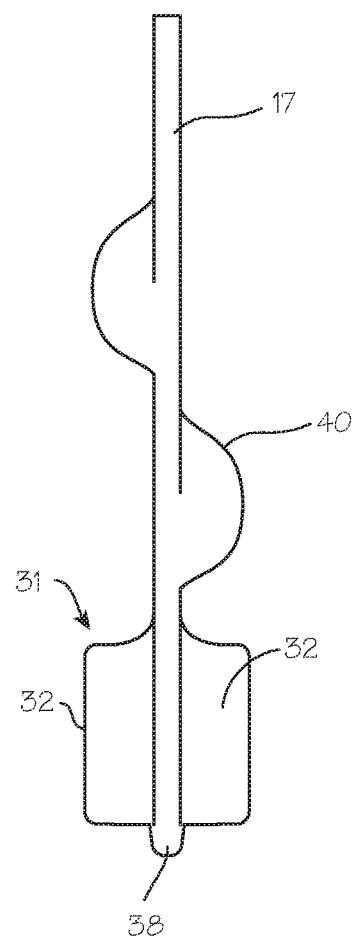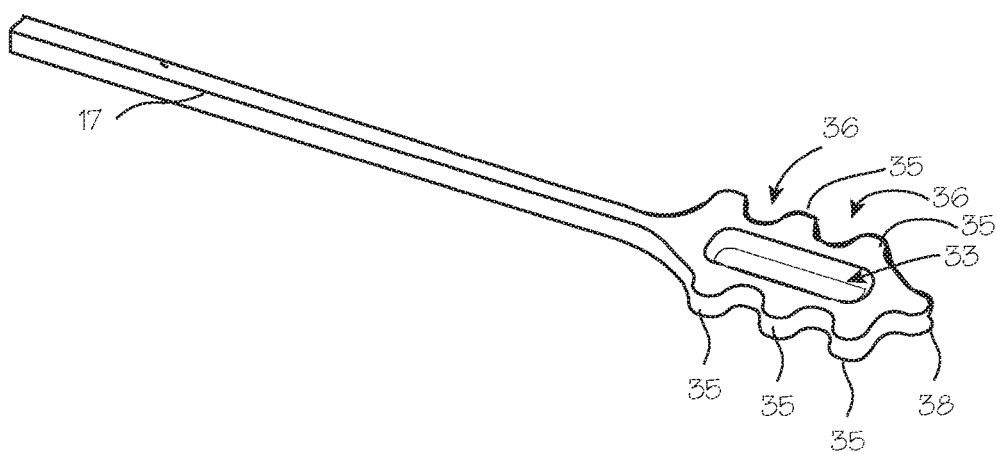

MACERATOR FOR INTRACRANIAL SURGERY

FIELD OF THE INVENTIONS

The inventions described below relate to the field of cautery of blood vessels during minimally invasive brain surgery.

BACKGROUND

Stroke is a common cause of death and disabling neurologic disorder. Approximately 700,000 patients suffer from stroke in the United States every year. Hemorrhagic stroke accounts for 20% of the annual stroke population. Hemorrhagic stroke is due to a rupture of a blood vessel in the brain, causing bleeding into the brain tissue and resulting in a hematoma (a blood mass) in the brain. Prompt removal of the blood mass is necessary to limit or prevent long-term brain injury.

Various tools may be used to remove blood masses from the brain and limit bleeding within the brain. Long, thin probes with features that provide for maceration and disruption of clots within the brain, aspiration of tissue (blood and bits of macerated clot) from the brain, and cautery of bleeding blood vessels within the brain, are used to treat hematomas in the brain. The tools are typically inserted into the brain through a cannula, placed through the skull. Separate probes may be used for maceration, for aspiration, and for cautery, or a single tool can includes features which are useful for several treatments.

Tools currently in use can be improved is various aspects, as described below.

SUMMARY

The devices and methods described below provide for improved treatment of blood masses in the brain, and other tissue throughout the body. The devices provide for secure cautery of blood vessels within the brain, such as those that might bleed during minimally invasive surgery for removal of a blood mass from the brain. The devices include an elongate probe suitable for insertion into the brain through a cannula, with electrodes on the distal tip of the device for applying cauterizing energy to cauterize a blood vessel within the brain, and a control system operable to test for continuity between the electrodes prior to or during the application of cauterizing energy. The control system is also operable to prevent or discontinue application of cauterizing energy should continuity testing provide a measure of continuity which is inconsistent with good electrical contact of the electrodes within the area of the brain to which RF is to be applied to cauterize a blood vessel.

The device may also include a pressure sensor, disposed on the distal tip of the probe, operable to sense the pressure applied by the probe to tissue within the brain, and generate a signal corresponding to pressure applied by the probe to tissue within the brain. The control system may then be operable to receive the signal prior to or during the application of cauterizing energy and also be operable to prevent or discontinue application of cauterizing energy should the signal be indicative of pressure which is inconsistent with good physical or electrical contact of the electrodes with the area of the brain to which cauterizing energy is to be applied to cauterize a blood vessel.

The RF cautery probe, with or without the impedance and/or pressure sensing features, may also be configured to provide suction for aspiration of tissue from a surgical space, and may be modified by placement of the electrodes in circumferential alignment with a side-facing window in the wall of a tube of the probe. Placement of the electrodes on the outer side wall of the tube, on the same side of the tube as the side-facing window, allows for simultaneous viewing of a blood vessel to be cauterized, the aspiration window and the electrodes, especially when the surgical space is accessed through a cannula.

The probe, with or without RF cautery electrodes, may include a macerating structure suitable for disrupting blood clots within the brain with improved performance in disrupting clots or diseased tissue

BRIEF DESCRIPTION OF THE DRAWINGS

FIG. 2 illustrates an RF cautery probe, with an alternate configuration of sensors, for use in the brain of a patient.

FIG. 3 illustrates an RF cautery probe, with an alternate configuration of RF electrodes, for use in the brain of a patient.

FIGS. 4 through 7 and 8 illustrate a new macerating structure for use in the macerating and aspiration operation of the probe.

DETAILED DESCRIPTION OF THE INVENTIONS

Figure 1:
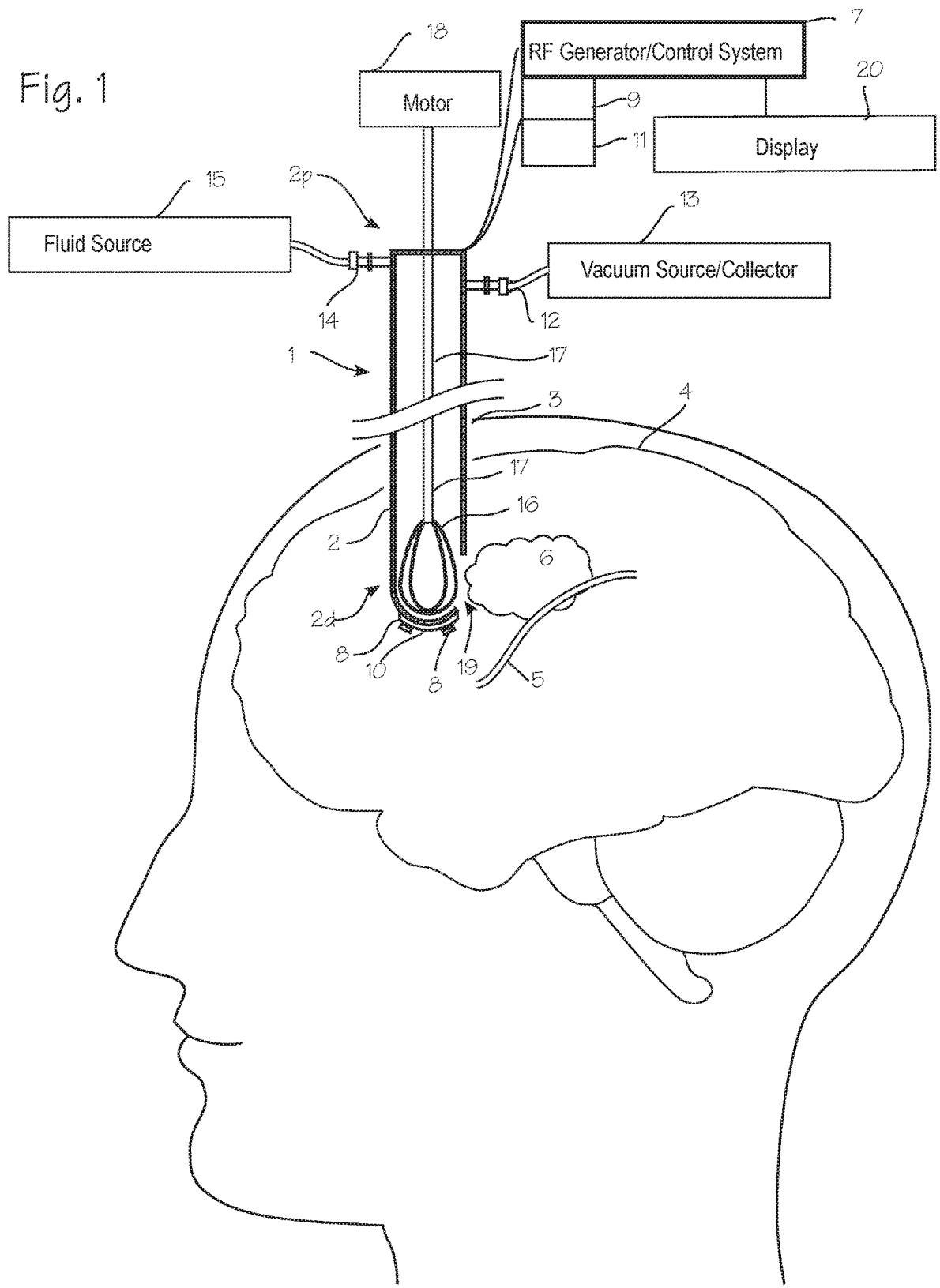
FIG. 1 illustrates an RF cautery probe for use in the brain of a patient.

FIGS. 1 and 2 show a cautery probe 1, shown in the environment of use, comprising a tube 2 with a distal end 2d configured for insertion into the brain through a surgically created opening (burr hole or a craniotomy or craniectomy opening 3) in the skull of a patient. The cautery probe is intended for use in treating a leaking blood vessel in the brain 4, such as blood vessel 5, which may be associated with a blood mass 6. The proximal end 2p of the probe is configured for attachment to a power supply and control system 7. The power supply is operable to supply cauterizing energy, preferably RF energy, through electrodes 8 to tissue surrounding the electrodes. A pair of electrodes 8 are disposed on the distal end of the probe, electrically connected to the power supply and control system, and these electrodes can be used to transmit RF energy from the control system, through the electrodes, to structures within the brain, such as the bleeding blood vessel. The electrodes are also operable to measure the continuity between the electrodes through tissue in contact with the electrodes, in conjunction with a conductivity or impedance meter 9 to provide signals indicative of the conductivity or impedance of tissue disposed between the electrodes (the conductivity meter may be integral to or separate from the control system). The electrodes are preferably disposed on a distal-facing surface of the distal tip of the probe. The probe may also include a pressure sensor 10 disposed on the distal tip of the probe, proximate the electrodes, to detect the amount of pressure applied by the probe to surrounding tissue, in conjunction with a control unit 11 (which may also be referred to as a signal conditioner) and provide signals indicative of the pressure applied to the sensors by surrounding tissue (the control unit may be integral to or separate from the control system). The pressure sensor, if provided, is disposed relative to the electrodes such that it may sense pressure applied by the probe in the immediate proximity of the electrodes, such that a sufficiently high pressure reading from the pressure sensor may be taken as a proxy for sufficiently high pressure contact of the electrodes with the intended tissue, such as a blood vessel. Various configurations may be effective. FIG. 1 shows the pressure sensor 10 disposed underneath the electrodes, sandwiched between the electrodes 8 on the distally facing surface of the distal tip of probe. FIG. 2 shows the pressure sensor 10 disposed between the electrodes 8 on the distally facing surface of the distal tip of probe. Other configurations may also be employed to obtain the benefits of the continuity sensors and pressure sensor. For example, the electrodes may be disposed on an outer cylindrical side-wall of the probe, and the pressure sensor may be disposed circumferentially between the electrodes.

Although RF (radiofrequency) cautery is preferred, the electrodes and control system may be used to supply direct current (DC) or heat as the cauterizing energy (in the case of thermal cautery, the electrodes, or separate heating elements, may be highly electrically resistant).

The probe may be used in conjunction with other probes which provide for extraction of a blood mass in the brain, which must typically be accomplished in conjunction with cauterizing the leaking blood vessel. These functions may instead be provided in a single probe. For example, the probe may include other features to perform other functions such as maceration and aspiration of the blood mass. For example, the probe may include suction port 12 in fluid communication to a vacuum source 13 and waste collector. The probe may also include fluid supply port 14 in fluid communication with a fluid source 15 (and, if necessary, a pump to pump fluid through the port and the tube and into the site of the blood mass). A macerating structure whisk 16 on a rod 17 and motor 18 operably connected to the rod may be provided with the probe. The side-facing window 19 is located on the side wall of the tube near the distal end 2d provides for application of suction to the blood mass 6, contact between the macerator whisk 16 and the blood mass, and fluid delivery from the fluid source 15 to the blood mass and surrounding areas. An associated display 20 may be provided to present visual information regarding the continuity or pressure sensed by the probe sensors, and parameters of the additional features. For ease of operation, a handle may be fixed to the proximal end. The various functions of whisk/beater rotation, application of suction, injection of fluids, application of cauterizing energy, ultrasound or heating, may be controlled with switches or buttons on the handle, on the respective actuator device, control boxes, and power sources, or on an associated foot switch.

In use, a surgeon will insert the probe into the brain through the surgical opening. Preferably, the probe will include aspirating and/or macerating features, which the surgeon may use to extract the blood mass. If the surgeon encounters a bleeding blood vessel, the surgeon will press the tip of the probe against the blood vessel, and activate the power supply and control system to provide RF energy (or other cauterizing energy) to the electrodes. Upon providing operating input to the control system to initiate supply of RF power to the electrodes, the control system will operate to:

test the electrical conductivity, continuity or resistance between the two electrodes through the space surrounding the electrodes, to test for the presence of tissue consistent with the blood vessel and, preferably, inconsistent with contact merely with blood (coagulated or uncoagulated) or brain tissue (grey matter, white matter) using conductivity or impedance testing means such as an electrical conductivity meter (inductive or potentiometric), a Wheatstone bridge, within the control system or power supply (alternatively, resistance can be measured with an ohm-meter); and operate to control application of RF energy through the first and second RF electrodes in response to the degree of electrical conductivity, continuity or resistance measured by the means for testing, and selectively apply RF energy in response to operator input when conductivity, continuity or resistance, as determined by the means for testing, is indicative of good contact with appropriate tissue. For electrical conductivity, the system will selectively apply RF energy in response to operator input when conductivity is detected in the range of 0.02 to 0.3 S/m, and prevent or discontinue application of RF energy if conductivity, as determined by the means for testing, measures greater than 0.3 S/m.

Operation of the cautery probe according to these parameters will help ensure that RF energy is not applied to the electrodes when the probe tip is located within a blood mass (with a typical conductivity of about 0.4 to 0.7 S/m), and will more certainly be applied to brain tissue (with a typical conductivity of about 0.03 to 0.03 S/m) in which a very small blood vessel is bleeding.

The control system may also be configured to control the system in response to pressure signals from the pressure sensor. If a pressure sensor is included on the distal tip of the probe, the control system may also function to:

control operation of the pressure sensor and/or control unit to provide signals to the control system corresponding to the pressure against the probe due to contact with body tissue, and receive those signals; and operate the RF power supply to selectively apply RF energy in response to operator input when pressure, as determined by the pressure sensor, measures in the range of 2.3 to 7 N/cm$^2$, (23 kPa to 70 kPa) and prevent or discontinue application of RF energy if resistance, as determined by the means for testing, measures less than about 2.3 N/cm$^2$.

Operation of the cautery probe according to these parameters will help ensure that RF energy is not applied to the electrodes when the probe tip is located within a blood mass which offers little resistance to the probe tip, and will more certainly be applied to firm brain tissue in which a very small blood vessel is bleeding, which offers markedly higher resistance and back-pressure on the distal tip of the probe.

The control system may also be configured to control the system in response to either the pressure signals or the conductivity, continuity or resistance, or both. The control system is preferably configured to test both electrical contact and physical contact, and apply RF through the electrodes only when signal from the conductivity or impedance testing means are indicative of good electrical contact and signals from the pressure sensor are indicative of good physical contact with an area of the brain to which RF is intended to be applied in order to cauterize a bleeding blood vessel.

The probe may be used without the automatic operation described above, while still obtaining the advantage of applying RF energy to tissue through the electrodes when continuity and pressure signals are indicative of good electrical and physical contact with an intended target tissue. The control system may be configured to receive signals indicative of continuity from the electrodes and continuity meter, and receive signals indicative of pressure on the pressure sensor from the pressure sensor and control unit, and provide this information on a display viewable to the surgeon, without also being configured to automatically prevent application of RF energy as described above, and the surgeon may use the sensors and displayed information to decide if the probe is positioned in tissue which the surgeon intends to cauterize. The control system may also be configured to operate in one mode in which it operates to prevent application of RF energy as described above, and in a second mode where it provides information to the surgeon as described in this paragraph to allow the surgeon to apply RF regardless of the sensed continuity and pressure.

The probe may be used in other surgical procedures, such as tissue cutting and ablation, in the minimally invasive or open surgery of the spine or in general surgery.

FIG. 3 illustrates an RF cautery probe, with an alternate configuration of RF electrodes, for use in the brain of a patient. In this embodiment, the electrocautery probe is similar to the probe shown in FIGS. 1 and 2, and comprises the tube 2 with a distal end 2d configured for insertion into the brain through the surgically created opening 3 in the skull of a patient, again shown is position to treat a leaking blood vessel such as blood vessel 5, which may be associated with a blood mass 6. The power supply and control system 7 are operable to supply cauterizing energy, preferably RF energy, through electrodes 21 to tissue surrounding the electrodes. The pair of electrodes 21 are also electrically connected to the power supply and control system and operable to transmit RF energy from the control system, through the electrodes, to structures within the brain. These electrodes are disposed on the outer side wall of the probe, at the distal end of the probe, proximate the suction port 19 rather than a distal-facing surface of the distal tip of the probe. The electrodes are disposed on the same side of the probe as the suction port, just distal to the suction port (radially aligned, along the circumference of the tube 2, with the suction port 12. With this construction, the surgeon will be able to view, directly or through a camera and display configured to obtain video images of the target tissue, the suction port, any diseased tissue directly outside the suction port, and the electrodes, all at the same time. This may facilitate application of cauterizing energy to appropriate structures while clearing the field of view, and the area immediately proximate the electrodes, of any blood or debris so that those structures, and contact of the electrodes with those structures, can be seen clearly.

The features of the front-facing electrode arrangement may achieved in a device in combination with the pressure sensor features, or without the pressure sensor features. The probe may be used in other surgical procedures which require cauterization, including minimally invasive or open surgery of the spine or in general surgery.

FIGS. 4 through 7 illustrate an aspiration/macerating tool with a new macerating paddle for use in the macerating and aspiration operation of the probe. The probe and associated system components of FIG. 1 may be used in this embodiment, including the electrodes and fluid source and vacuum source. The macerating structure 31 in this embodiment comprises blades 32, projecting radially from the center, with a substantially flat arrangement, with one blade on either side of the distal end of the macerator rod 17, and may also include a central aperture 33. The macerating structure is disposed within the tube such that the blade is located in longitudinal alignment with the window 19, so that upon rotation of the blade while the window is pressed against the blood mass 6, the blade will disrupt and macerate the blood mass. The flat blade tissue disruptor illustrated has a maximum radial width which closely matches the inner diameter of the inner tube. The disrupting structure may have an outer profile 34 which includes a number of radial projections 35 (projecting outwardly from the center, along a radius), or corresponding notches 36. The width of each blade of the macerating structure, at the level of a projection (or conversely, excepting the level of the notches), closely matches an inner radius of the tube, such that rotation of the macerating structure, when the aperture is mashed into the blood mass, may scrape, sheer and/or sever tissue from the blood mass and into the lumen of the tube. In the embodiment shown, where the two blades 32 are co-planar, this results in a macerating structure in which the maximum width of the macerating structure, at the area of the window, closely matches the inner diameter of the tube. The disrupting structure may also have straight outer edges 37 as shown in FIG. 8, without the projections and notches, in which case the overall radius of the macerating structure along a length of the macerating structure closely matches the inner radius of the tube. As illustrated, the macerating structure comprises only two blades, both lying in the same plane, but the macerating structure can comprise three or more blades, dispersed around the end of rod 17. The macerating structure can include a distally extending projection 38, which fits into a corresponding socket 39 in the inside of the distal tip of the tube, to provide a bearing surface to stabilize the macerating structure during rotation.

Radially extending projections, such as one or more arcuate protrusions 40 may be disposed on the rod 17, located proximally relative to the macerating structure 31, and within the tube 2. These protrusions operate to further break down any fibrous tissue drawn into the tube, to avoid blockage of the tube.

The macerator blade may be rotated by the motor 18, and the vacuum source may be operated while the macerator structure is rotated to draw any tissue separated by the macerator into and through the tube.

The features of the rectangular macerator structure may be achieved in a device in combination with the pressure sensor features, with the front-facing electrode features, or without either of these features. The probe may be used in other surgical procedures, such as tissue cutting and ablation, in the minimally invasive or open surgery of the spine or in general surgery.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A device for removal of body tissue, said device comprising:
    an elongate probe comprising a first tube with a distal end and a proximal end, said distal end configured for insertion into a surgical space in a patient;
    a side-facing aperture located on a side wall of the first tube near the distal end of the first tube;
    a macerator assembly comprising a rod having a proximal end and a distal end and establishing a longitudinal center line of the macerator assembly, and a macerator structure disposed at the distal end of the rod wherein the macerator structure is disposed within the first tube, longitudinally aligned with the side-facing aperture and rotatable within the probe and operable to disrupt body tissue proximate the side-facing aperture, wherein said macerator structure comprises a first flat blade, extending radially outwardly from the longitudinal center line, said blade having a width which closely matches an inner radius of the first tube.

2. The device of claim 1, wherein the probe has a lumen extending from the proximal end of the first tube to the side-facing aperture, and a vacuum source in fluid communication with the side-facing aperture through said a lumen.

3. The device of claim 1, wherein the macerating structure further comprises a second flat blade, disposed on the distal end of the rod and co-planar with the first flat blade, and also having a width corresponding to the inner radius of the probe, such that the macerating structure has a width which closely matches an inner diameter of the first tube.

4. The device of claim 3, wherein the first flat blade and second flat blade lie in a first plane, and the rod also lies in said first plane.

5. The device of claim 3, wherein the rod lies in a plane longitudinally dissecting the first tube, and the first blade and second blade lie in said plane longitudinally dissecting the first tube.

6. The device of claim 1, 2 or 3, wherein the probe further comprises a socket inside the probe, at the distal end of the first tube, and the macerating structure further comprises a distally extending projection which extends into the socket, said socket configured to provide a bearing surface to stabilize the macerator structure during rotation of the macerator structure.

7. The device of claim 1, 2 or 3, wherein the macerating structure comprises one or more notches in an outer edge of the blade.

8. The device of claim 1, 2 or 3, wherein the blades of the macerating structure comprises a straight radial outer edge.

9. The device of claim 1, 2 or 3, further comprising a radially extending projection disposed on the rod proximal to the macerating structure, said projections having a planar configuration and being disposed in a first plane longitudinally dissecting the first tube.

10. The device of claim 1 wherein the flat blade of the macerating structure comprises a rectangular shape with a plurality of radial projections, and the width of the macerating structure, at said projections, closely matches the inner radius of the first tube.

11. The device of claim 1, wherein the first flat blade defines a first plane, and the rod lies in said first plane.

12. The device of claim 1, wherein the rod lies in a plane longitudinally dissecting the first tube, and the first blade lies in said plane longitudinally dissecting the first tube.

* * * * *